United States Patent Office 3,436,460
Patented Apr. 1, 1969

3,436,460
METHODS OF CONTROLLING PROTOZOA INFECTIONS WITH N-SUBSTITUTED, 1,4- DIAMINO-2,3-ANTHRAQUINONEDICARBOXIMIDES
Donald C. Boughton, Kennett Square, Pa., assignor to E. I. du Pont de Nemours and Company, Wilmington, Del., a corporation of Delaware
No Drawing. Continuation-in-part of application Ser. No. 596,820, Nov. 25, 1966. This application Jan. 16, 1968, Ser. No. 698,150
Int. Cl. A01n 9/22
U.S. Cl. 424—274          5 Claims

ABSTRACT OF THE DISCLOSURE

This invention teaches a method for using anthraquinonedicarboximides as anti-protozoa agents. Representative of the compounds for use according to the method of this invention are compounds such as 1,4-diamino-N-(3-dimethylaminopropyl) - 2,3 - anthraquinonedicarboximide and 1,4-diamino-N-(2-aminopropyl)-2,3-anthraquinonedicarboximide.

Cross-reference to related applications

This application is a continuation-in-part of copending U.S. application, Ser. No. 596,820 which was filed Nov. 25, 1966 and is now abandoned, which was a continuation-in-part of then copending U.S. application, Ser. No. 443,634, which was filed Mar. 24, 1965, and is now abandoned.

Background of the invention

This invention relates to the method of using anthraquinonedicarboximides as pharmaceutical agents.

More particularly, according to the present invention, it has been found that certain N-substituted, 1,4-diamino-2,3-anthraquinonedicarboximides are useful for the prevention and treatment of infections in warm-blooded animals caused by pathogenic protozoa.

Description of the invention

The compounds for use according to the method of this invention are represented by the following formula:

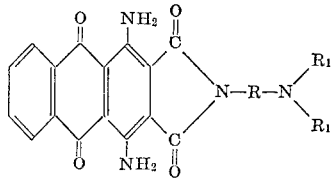

where R is

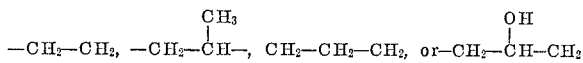

and $R_1$ is hydrogen, methyl, ethyl, hydroxyethyl, or aminoethyl which may be the same or different for the different positions on the molecule with the proviso, however, that when one but either $R_1$ is hydroxyethyl or aminoethyl, the remaining $R_1$ is hydrogen.

Also to be included as compounds suitable for the purposes of the present invention, particularly when used via a parenteral route, are non-toxic, water soluble salts of compounds defined by the above-formula. The hydrochloride salt is especially suitable in this respect since in addition to being non-toxic and water soluble, this salt is stable and economical to prepare.

Particularly preferred compounds for purposes of the present invention are the following:

1,4-diamino-N-(3-dimethylaminopropyl)-2,3-anthraquinonedicarboximide
1,4-diamino-N-(3-hydroxyethylaminopropyl)-2,3-anthraquinonedicarboximide
1,4-diamino-N-(2-hydroxyethylaminoethyl)-2,3-anthraquinonedicarboximide
1,4-diamino-N-(2-aminoethyl)-2,3-anthraquinonedicarboximide
1,4-diamino-N-(2-dimethylaminoethyl)-2,3-anthraquinonedicarboximide
1,4-diamino-N-(2-aminopropyl)2,3-anthraquinonedicarboximide
1,4-diamino-N-(2-hydroxy-3-aminopropyl)-2,3-anthraquinonedicarboximide
1,4-diamino-N-(2-aminoethylaminoethyl)-2,3-anthraquinonedicarboximide Suitable methods for the preparation of the compounds coming within the scope of the present invention are set forth in U.S. Patent 2,701,802 issued Feb. 8, 1955.

The compounds for use according to the method of this invention demonstrate a broad spectrum of activity when tested in vitro. For example, the above identified compounds are found to inhibit the growth of Eimeria tenella.

The compounds for use according to the method of this invention are particularly effective when employed to control protozoan infections in warm-blooded animals.

For example, 1,4-diamino-N-(3-dimethylaminopropyl)-2,3-anthraquinonedicarboximide, a representative compound for use according to the method of this invention, when administered to mice infected with Plasmodium berghei prolongs the life of said mice to 10–11 days when compared to untreated mice which survive for 6–7 days.

The compounds for use according to the method of this invention are preferably used to control coccidiosis in warm-blooded animals, most preferably in domestic fowl such as chickens and turkeys.

For purposes of the invention, the above-defined compounds can be administered orally or parenterally, that is, subcutaneously, intramuscularly, or intraperitoneally. The dosage administered will be dependent upon the particular disease treated; the nature of the effect desired; the age, health, and condition of the recipient involved; and the kind of concurrent treatment, if any. Usually, however, the dosage of active ingredient compound will be from 1 to 50 milligrams per kilogram of body weight per day (mg./kg./day). Preferably, the dosage will be an amount in the range of from 5 to 20 mg./kg./day.

The active ingredient compounds can be employed in useful composition according to the present invention in such dosage forms as tablets, capsules, powder packets, or liquid solutions, suspensions, or elixirs, for oral administration or liquid solutions or suspensions for parenteral use.

Besides the active ingredient compound or compounds of this invention, these dosage compositions will contain a solid or liquid non-toxic pharmaceutical carrier.

In one embodiment of a pharmaceutical composition of this invention, the solid carrier is a capsule which can be of the ordinary gelatin type. In the capsule will be from about 30 to 60% by weight of active ingredient compound and 70 to 40% by weight of a carrier. In a further embodiment, the active ingredient compound or compounds are tableted with adjuvants. In still another embodiment, the active ingredient compound is put into powder packets and employed. These capsules, tablets and powders will generally contain from about 5 to about 90% by weight but more preferably from about 25 to 95% by weight of the active ingredient compound. In the treatment of warm-blooded animals these dosage forms preferably contain from about 5 mg. to 5 gm. of active ingredient. The amount of active ingredient in said dosage form being determined by the body weight of the warm-blooded animal being treated, size acceptability of the dosage form to the warm-blooded animal being treated and frequency of administration to the warm-blooded animal being treated. The above mentioned dosage forms are designed to deliver from 1 to 50 milligrams per kilogram of body weight per day (mg./kg./day) in single or divided doses.

The pharmaceutical carrier also can be a sterile liquid such as water and oils, including those of petroleum, animal, vegetable, or synthetic origin, for example, peanut oil, soybean oil, mineral oil, sesame oil, and the like. For liquid solutions, suspensions, or syrups for oral administration a watery vehicle such as an aromatic water, a syrup or a pharmaceutical mucilage is the preferred carrier. These liquid compositions for oral administration contain an amount or active ingredient in the range of from about 0.5 to 10% by weight but more preferably an amount in the range of from about 2 to 5% by weight.

For solutions to be administered parenterally, water saline, aqueous dextrose (glucose) and related sugar solutions and glycols such as propylene glycol or polyethylene glycols are preferred liquid carriers. Sterile injectible solutions of this type will ordinarily contain from about 0.5 to 25% by weight, preferably from about 10 to 20% by weight, of the active ingredient compound as its HCl salt.

Further information concerning suitable pharmaceutical carriers is disclosed in "Remington's Pharmaceutical Sciences" by E. W. Martin, a well-known reference text in this field.

In addition to the embodiments discussed above, the formulation aspects of the invention are further illustrated by the following examples:

EXAMPLE 1

A large number of unit capsules are prepared by filling two-piece hard gelatin capsules weighing about 50 milligrams each with 50 milligrams of powdered 1,4-diamino-N-(3-dimethylaminopropyl) - 2,3 - anthraquinonedicarboximide, 125 grams of lactose, and 1 milligram of "Cab-o-Sil"®.

EXAMPLE 2

Example 1 is repeated except that soft gelatin capsules are used and powdered 1,4-diamino-N-(3-dimethylaminopropyl)-2,3-anthraquinonedicarboximide is first suspended in mineral oil.

EXAMPLE 3

Example 1 is repeated except that the dosage unit is 50 milligrams of active ingredient compound, 5 milligrams of gelatin, 1.5 milligrams of magnesium stearate, and 100 milligrams of lactose, mixed and formed into a tablet by a conventional tableting machine. Slow release tablets can also be used, by applying appropriate coatings. A sugar coating can be applied, if desired, to increase palatibility.

EXAMPLE 4

A parenteral composition suitable for administration by intramuscular injection is prepared by stirring 1.0 gram of the HCl salt of the compound of Example 1 in 100 milliliters of saline.

A very desirable means for administering the active ingredient compounds to livestock or domestic animals involves admixing the compound with a suitable animal feed. Descriptions of suitable feeds can be found in the book "Feeds and Feeding" by Frank B. Morrison, published by the Morrison Publishing Company of Ithaca, N.Y., 1948, 21st edition. The selection of the particular feed, of course, may vary widely depending on the animal, the economics, natural materials available, and the surrounding circumstances, as will be readily understood by those skilled in the art.

A particularly desirable dosage composition for treating animals according to the invention is a concentrate suitable for preparation and sale to a farmer or livestock grower for addition to the animal's feedstuffs in appropriate proportion. These concentrates ordinarily comprise about 10 to 25% by weight of the active ingredient compound together with a finely-divided solid feedstuff such as ground corn, wheat, soybean, or cottonseed. Such a concentrate can contain, in addition, other components as may be desirable to incorporate into animal feeds such as proteins, carbohydrates, fats, vitamins, minerals antibiotics, etc.

The following example illustrates the preparation and use of a feed concentrate according to the present invention:

EXAMPLE 5

Two pounds of feed concentrate is prepared containing 12.5% by weight of 1,4-diamino-N-(3-hydroxyethylaminopropyl)-2,3-anthraquinonedicarboximide in ground corn. The concentrate is then admixed with a ton of conventional poultry feed and supplied in the normal diet of chickens as a prophylactic treatment against cecal coccidiosis.

I claim:
1. A method of controlling pathogenic protozoan infection of a warm-blooded animal comprising administering to said warm-blooded animal an effective amount of a compound of the formula:

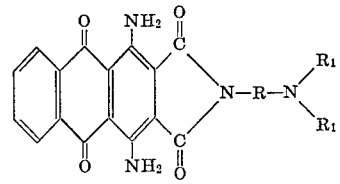

where R is selected from the group consisting of

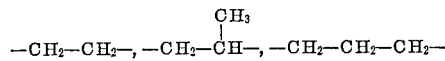

and

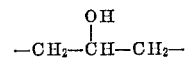

and $R_1$ is selected from the group consisting of hydrogen, methyl, ethyl, hydroxyethyl, and aminoethyl with the proviso that when $R_1$ for either position on the molecule is selected from the group consisting of hydroxyethyl and aminoethyl, the remaining $R_1$ is hydrogen.

2. The method of claim 1 wherein the compound is 1,4-diamino - N - (3-dimethylaminopropyl)-2,3-anthraquinonedicarboximide.

3. The method of claim 1 wherein the compound is 1,4 - diamino - N - (3-hydroxyethylaminopropyl) - 2,3-anthraquinonedicarboximide.

4. The method of claim 1 in which the protozoan infection controlled is coccidiosis and the host treated is selected from the group consisting of chickens and turkeys.

5. The method of claim 2 in which the protozoan infection controlled is coccidiosis and the host treated is selected from the group consisting of chickens and turkeys.

References Cited

UNITED STATES PATENTS 2,701,802  2/1955  Boyd _____ 260—326

ALBERT T. MEYERS, Primary Examiner.

J. D. GOLDBERG, Assistant Examiner.